(12) United States Patent
Lai

(10) Patent No.: US 11,254,182 B2
(45) Date of Patent: Feb. 22, 2022

(54) HEAT CONDUCTING DEVICE AND VEHICLE WITH THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Dong-Mei Lai, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 247 days.

(21) Appl. No.: 16/433,583

(22) Filed: Jun. 6, 2019

(65) Prior Publication Data

US 2019/0375268 A1 Dec. 12, 2019

(30) Foreign Application Priority Data

Jun. 12, 2018 (CN) .......................... 201810602043.5

(51) Int. Cl.
*B60H 1/00* (2006.01)
(52) U.S. Cl.
CPC ..... *B60H 1/00328* (2013.01); *B60H 1/00507* (2013.01)

(58) Field of Classification Search
CPC ............ B60H 1/00328; B60H 1/00507; B60H 1/00321; B60H 1/00778; B60H 1/32; B60H 1/00257; B60H 1/00
See application file for complete search history.

(56) References Cited

U.S. PATENT DOCUMENTS

| | | | |
|---|---|---|---|
| 2015/0327405 A1* | 11/2015 | Niizuma | ............ H05K 7/20509 307/104 |
| 2016/0052421 A1* | 2/2016 | Galamb | .................. B60L 53/14 165/47 |
| 2016/0381829 A1* | 12/2016 | Niizuma | ............... B60L 53/124 361/699 |

FOREIGN PATENT DOCUMENTS

| | | |
|---|---|---|
| CN | 103832411 | 6/2014 |
| CN | 105121220 | 12/2015 |

\* cited by examiner

*Primary Examiner* — Emmanuel E Duke
(74) *Attorney, Agent, or Firm* — ScienBiziP, P.C.

(57) ABSTRACT

A heat conducting device in a vehicle whereby heat in the body or shell of the vehicle is transferred to the ground includes a control device, a heat transferring device, and a driving device. The heat transferring device is in the vehicle and is connected to the shell of the vehicle when the vehicle is flameout, the driving device is coupled to the control device and the heat transferring device, such that the heat transferring device is extended downwards from the vehicle, until the heat transferring device contacts the ground, thereby heat of the shell of the vehicle is transferred to the ground.

16 Claims, 6 Drawing Sheets

HEAT CONDUCTING DEVICE AND VEHICLE WITH THE SAME

CROSS-REFERENCE TO RELATED APPLICATIONS

This application claims priority to Chinese Patent Application No. 201810602043.5 filed on Jun. 12, 2018, the contents of which are incorporated by reference herein.

FIELD

The subject matter herein generally relates to heat dissipation technology, and particularly to a heat conducting device and a vehicle with the same.

BACKGROUND

Vehicles are often parked outside or in outdoor parking spaces. In sunlight, metal shell of the vehicle can absorb heat, and the internal temperature of the vehicle can rise to dangerous levels. Persons in the vehicles can be badly affected.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
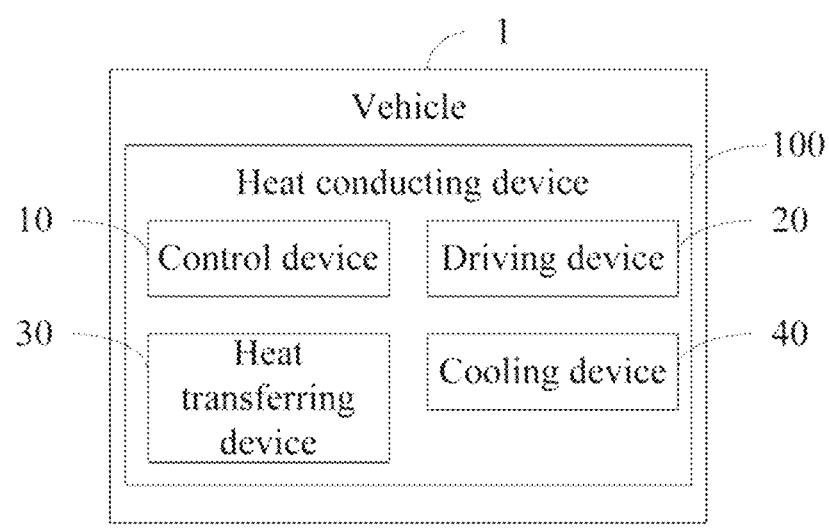
FIG. 1 is a block diagram of an embodiment of a heat conducting device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a heat conducting device 100. The heat conducting device 100 is applied in a vehicle 1. The heat conducting device 100 can transfer heat from the vehicle 1 to the ground, and the vehicle 1 is thus cooled down.

Figure 2:
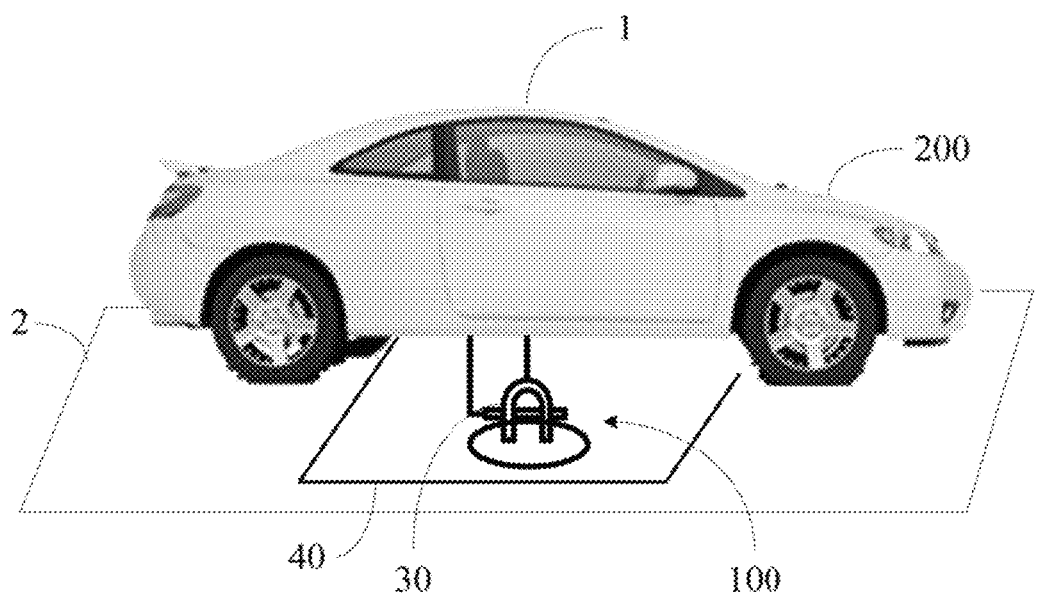
FIG. 2 is a schematic diagram of an embodiment of the heat conducting device in a working state.

Referring to FIGS. 1-2, the vehicle 1 includes, but is not limited to, the heat conducting device 100 and an outer body (shell 200). The heat conducting device 100 includes, but is not limited to, a control device 10, a driving device 20, and a heat transferring device 30. The driving device 20 is electrically coupled to the control device 10 and the heat transferring device 30. The heat transferring device 30 is connected to the shell 200 of the vehicle 1, and can transfer the heat from the shell 200 to the ground.

In at least one embodiment, the control device 10 is arranged in the vehicle 1, the control device 10 can be a central processing unit (CPU), a microprocessor, or other data processor chip that performs functions of the heat conducting device 100. The driving device 20 can be a stepper motor. The driving device 20 and the heat transferring device 30 are arranged in a bottom of the vehicle 1. The control device 10, the driving device 20, and the heat transferring device 30 can be powered by a battery of the vehicle 1.

As illustrated in FIG. 2, in at least one embodiment, the control device 10 is further electrically coupled to an engine (not shown) of the vehicle 1. When the vehicle 1 is parked, the engine stops working, the control device 10 will receive a shut down signal from the engine, and the driving device 20 is controlled to drive the heat transferring device 30 to extend from the bottom of the vehicle 1 to the ground, at this time, the heat transferring device 30 contacts the ground. In at least one embodiment, when the heat transferring device 30 cannot move, the heat transferring device 30 is taken as contacting the ground, the control device 10 stops controlling the driving device 20.

Ground temperature is lower than the temperature of the shell 200 of the vehicle 1, so that the heat transferring device 30 can transfer the heat from the shell 200 to the ground.

Figure 3:
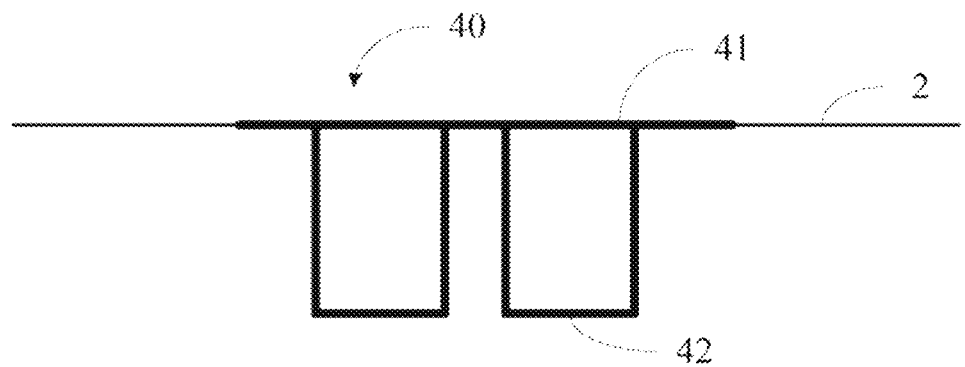
FIG. 3 is a schematic diagram of an embodiment of a cooling device.

Referring to FIGS. 2-3, the heat transferring device 30 further includes at least one cooling device 40, the cooling device 40 is arranged on the ground. In at least one embodiment, at least one parking space 2 is designated on the ground. The cooling device 40 is arranged in a predetermined position within the parking space 2.

In at least one embodiment, the cooling device 40 is disposed under the ground, an upper surface of the cooling device 40 is exposed and is level with the ground. The size of the upper surface of the cooling device 40 is larger than the size of a bottom surface of the heat transferring device 30, thus when the vehicle 1 is parked on the parking space 2, the heat transferring device 30 faces the cooling device 40.

When the vehicle 1 is parked on the parking space 2, the control device 10 controls the driving device 20 to drive the heat transferring device 30 to extend from the bottom of the vehicle 1, until the heat transferring device 30 contacts the cooling device 40. Temperature of the cooling device 40 is lower than the temperature of the shell 200 of the vehicle 1, the heat transferring device 30 can thus transfer the heat from the shell 200 to the cooling device 40.

Figure 4:
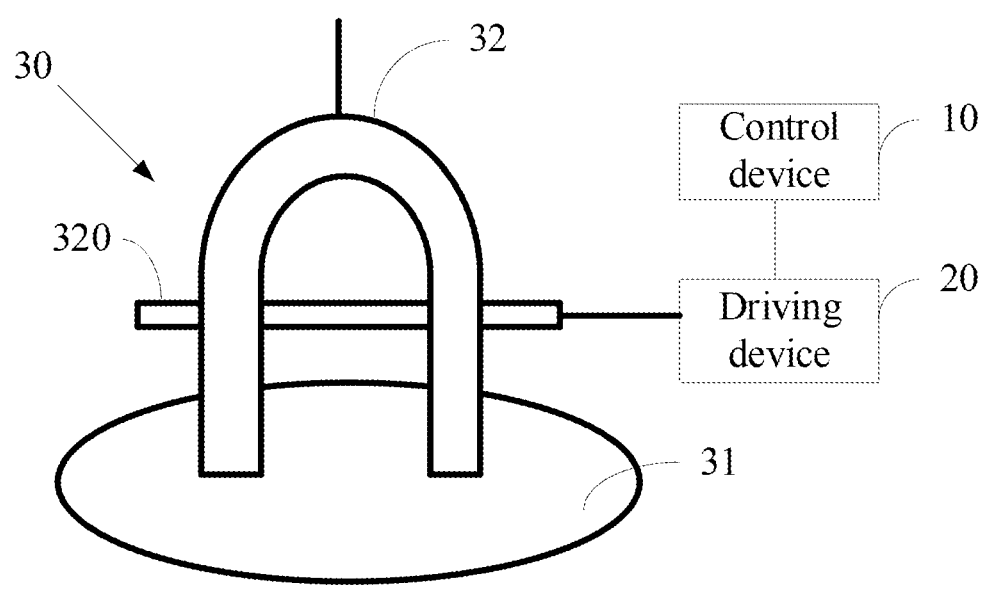
FIG. 4 is a schematic diagram of an embodiment of a heat transferring device of the heat conducting device.

Referring to FIG. 4, the heat transferring device 30 at least includes a metal disk 31 and a first U-shaped magnet 32. In at least one embodiment, the metal disk 31 is made from aluminum or copper materials. The first U-shaped magnet 32 is arranged above the metal disk 31. In an initial state, two poles of the first U-shaped magnet 32 are in contact with and attracting the metal disk 31. In at least one embodiment, the size of the bottom surface of the metal disk 31 is less than the size of the upper surface of the cooling device 40.

In at least one embodiment, the first U-shaped magnet 32 defines a shaft 320, the driving device 20 can drive the shaft 320 to rotate, and the shaft 320 can turn the first U-shaped magnet 32 over.

When the vehicle 1 is parked on the parking space 2, the driving device 20 drives the first U-shaped magnet 32 and the metal disk 31, to move towards the cooling device 40. In at least one embodiment, the cooling device 40 is also made from metal material. The two poles of the first U-shaped magnet 32 have the strongest magnetism, so that the first U-shaped magnet 32 is attracted to the cooling device 40, and the driving device 20 can easily drive the metal disk 31 to move down until the metal disk 31 contacts the cooling, device 40.

As illustrated in FIG. 3, in at least one embodiment, the cooling device 40 at least includes a cooling board 41 and a cooling bucket 42. The cooling board 41 is arranged above the cooling bucket 42, the cooling bucket 42 is arranged under the ground, an upper surface of the cooling board 41 is level with the ground. When the metal disk 31 contacts the cooling device 40, the heat from the metal disk 31 is transferred from the cooling board 41 to the cooling bucket 42, and the cooling bucket 42 transfers the heat to the ground.

When the vehicle 1 starts moving, the driving device 20 drives the first U-shaped magnet 32 to turn 180 degrees, and drives the first U-shaped magnet 32 to drive the metal disk 31 to move towards the bottom of the vehicle 1. Thus the metal disk 31 and the first U-shaped magnet 32 are received in the vehicle 1. When the first U-shaped magnet 32 turns 180 degrees, a middle part of the first U-shaped magnet 32 faces the cooling device 40, the middle part has the weakest magnetism, so that the first U-shaped magnet 32 would attract the cooling device 40 very weakly, and the driving device 20 can easily drive the metal disk 31 to move up until the metal disk 31 is received in the vehicle 1.

Figure 5:
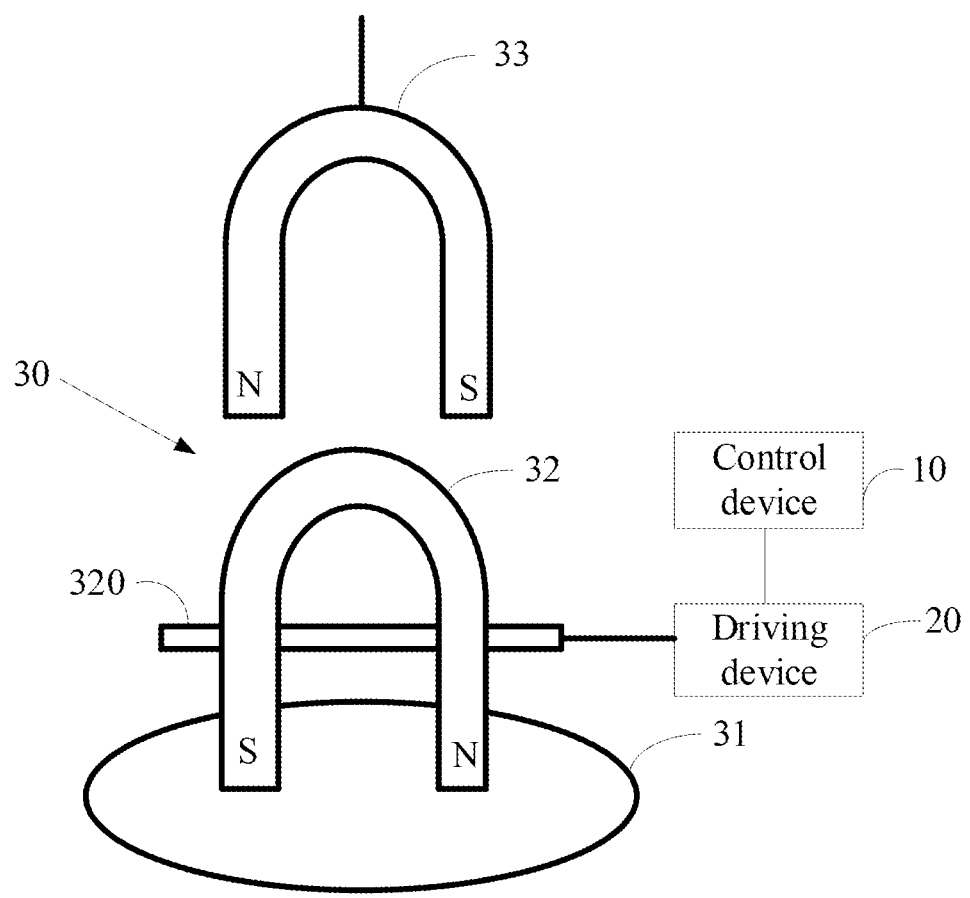
FIG. 5 is a schematic diagram of another embodiment of a heat transferring device of the heat conducting device.

Referring to FIG. 5, in another embodiment, the heat transferring device 30 further includes a second U-shaped magnet 33. The second U-shaped magnet 33 is arranged above the first U-shaped magnet 32, two poles of the second U-shaped magnet 33 are aligned in reverse to the poles of the first U-shaped magnet 32. Thus facing poles of the first U-shaped magnet 32 and the second U-shaped magnet 33 have opposite polarity. For example, an S-pole of the second U-shaped magnet 33 faces an N-pole of the first U-shaped magnet 32, and an N-pole of the second U-shaped magnet 33 faces an S-pole of the first U-shaped magnet 32.

In the another embodiment, when the vehicle 1 is parked on the parking space 2, the second U-shaped magnet 33 faces the middle part of the first U-shaped magnet 32. A force of attraction between the first U-shaped magnet 32 and the cooling device 40 is greater than a force of attraction between the second U-shaped magnet 33 and the first U-shaped magnet 32, so that the driving member 20 can easily drive the metal disk 31 to move down until the metal disk 31 contacts the cooling device 40.

When the vehicle 1 starts moving, the driving device 20 drives the first U-shaped magnet 32 to turn 180 degrees. At this time, the two poles of the first U-shaped magnet 32 face the opposite-polarity poles of the second U-shaped magnet 33. Since poles attract opposites, the force of attraction between the second U-shaped magnet 33 and the first U-shaped magnet 32 is greater than the force of attraction between the first U-shaped magnet 32 and the cooling device 40, so that the driving member 20 can easily drive the metal disk 31 to move up until the metal disk 31 is received in the vehicle 1.

In other embodiments, the heat conducting device 100 can not only control the metal disk 31 to move up and down through the magnet, but also can control the metal disk 31 to move up and down by motor or hydraulic means.

Figure 6:
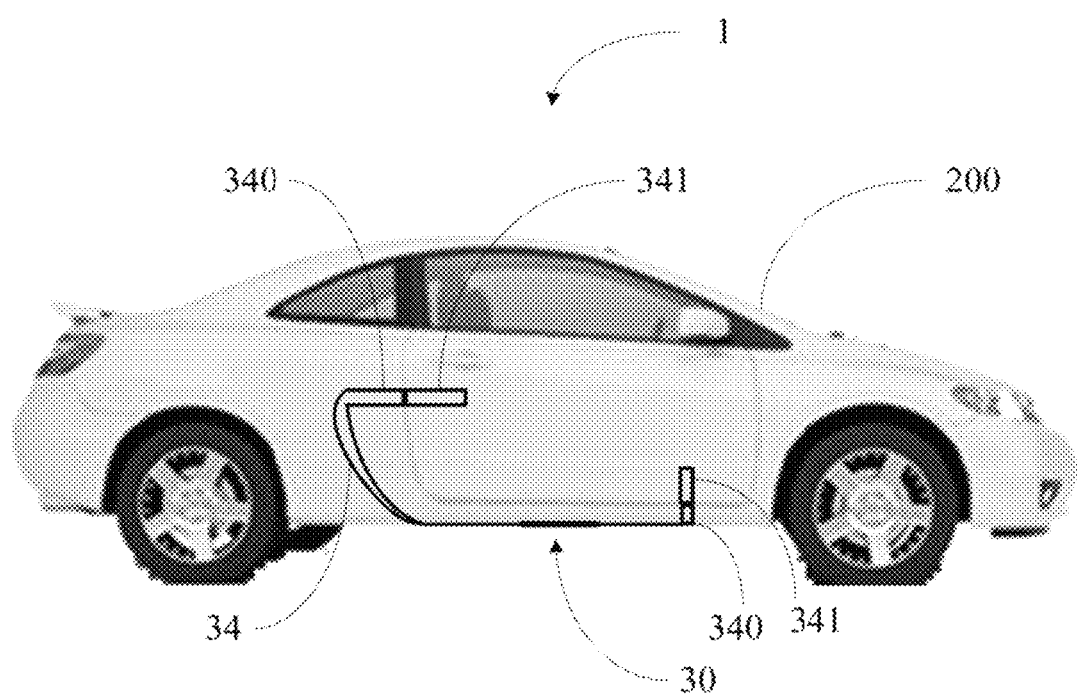
FIG. 6 is a schematic diagram of an embodiment of a distribution of heat pipes of the heat conducting device.

Referring to FIG. 6, the heat transferring device 30 further includes a number of heat pipes 34. The heat pipes 34 are arranged on the shell 200, the heat transferring device 30 is connected to the heat pipes 34. In at least embodiment, the heat pipe 34 includes a fixing member 340 and a moving member 341. The fixing members 340 are arranged on fixed portions of the shell 200, for example, the fixed portions can be on the vehicle roof and the vehicle body. The moving members 341 are arranged on movable portions of the shell 200, for example, the movable portions can be on the doors of the vehicle 1, a hood of the vehicle 1, and a trunk of the vehicle 1.

In at least one embodiment, the fixing members 340 are arranged on edges of the fixed positions, and the moving members 341 are arranged on edges of the movable positions. When the door of the vehicle 1, the hood of the vehicle 1, or the trunk of the vehicle 1 is closed, the moving member 341 is connected to the fixing member 340. Thus heat from the fixing member 340 and from the moving member 341, can be transferred by the heat pipe 34 to the heat transferring device 30, so that the vehicle 1 is cooled down more quickly.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A heat conducting device applicable in a vehicle comprising:
   a control device;
   a heat transferring device configured to be received in the vehicle and connected to a shell of the vehicle;
   a driving device coupled to the control device and the heat transferring device; and
   at least one cooling device arranged on ground, wherein when the vehicle is parked, the control device controls the driving device to drive the heat transferring device to extend from the vehicle, until the heat transferring device contacts the cooling device, the heat transferring device transfers the heat from the shell to the cooling device.

2. The heat conducting device according to claim 1, wherein the at least one cooling device comprises a cooling board and at least one cooling bucket, the cooling board is arranged above the cooling bucket, the cooling bucket is disposed under the ground, an upper surface of the cooling board is level with the ground, when the heat transferring device contacts the cooling device, the heat is transferred from the cooling board to the cooling bucket, and the cooling bucket transfers the heat to the ground.

3. The heat conducting device according to claim 1, wherein the heat transferring device comprises a metal disk and a first U-shaped magnet, the first U-shaped magnet is arranged above the metal disk, in an initial state, two poles of the first U-shaped magnet are in contact with and attracting the metal disk.

4. The heat conducting device according to claim 3, wherein a size of a bottom surface of the metal disk is less than a size of an upper surface of the cooling device.

5. The heat conducting device according to claim 3, wherein when the vehicle is parked, the driving device drives the first U-shaped magnet and the metal disk to move towards the cooling device; when the vehicle starts moving, the driving device drives the first U-shaped magnet to turn 180 degrees, and drives the first U-shaped magnet to drive the metal disk to move towards a bottom of the vehicle until the metal disk and the first U-shaped magnet are received in the vehicle.

6. The heat conducting device according to claim 5, wherein the heat transferring device further comprises a second U-shaped magnet, the second U-shaped magnet is arranged above the first U-shaped magnet, two poles of the second U-shaped magnet are aligned in reverse to the poles of the first U-shaped magnet, facing poles of the first U-shaped magnet and the second U-shaped magnet have opposite polarity.

7. The heat conducting device according to claim 1, wherein the heat transferring device further comprises a plurality of heat pipes arranged on the shell of the vehicle, the plurality of heat pipes transfer the heat from the shell to the heat transferring device, and the heat transferring device transfers the heat to the ground.

8. The heat conducting device according to claim 7, wherein the heat pipe includes a fixing member and a moving member, the fixing members are arranged on fixed portions of the shell, and the moving members are arranged on movable portions of the shell.

9. A vehicle comprising:
a shell; and
a heat conducting device comprising;
a control device;
a heat transferring device configured to be received in the vehicle and connected to a shell of the vehicle;
a driving device coupled to the control device and the heat transferring device; and
at least one cooling device arranged on the ground, wherein when the vehicle is parked, the control device controls the driving device to drive the heat transferring device to extend from the vehicle, until the heat transferring device contacts the cooling device, the heat transferring device transfers the heat from the shell to the cooling device.

10. The vehicle according to claim 9, wherein the at least one cooling device comprises a cooling board and at least one cooling bucket, the cooling board is arranged above the cooling bucket, the cooling bucket is disposed under the ground, an upper surface of the cooling board is level with the ground, when the heat transferring device contacts the cooling device, the heat is transferred from the cooling board to cooling bucket, and the cooling bucket transfers the heat to the ground.

11. The vehicle according to claim 9, wherein the heat transferring device comprises a metal disk and a first U-shaped magnet, the first U-shaped magnet is arranged above the metal disk, in an initial state, two poles of the first U-shaped magnet are in contact with and attracting the metal disk.

12. The vehicle according to claim 11, wherein a size of a bottom surface of the metal disk is less than a size of an upper surface of the cooling device.

13. The vehicle according to claim 11, wherein when the vehicle is parked, the driving device drives the first U-shaped magnet and the metal disk to move towards the cooling device; when the vehicle starts moving, the driving device drives the first U-shaped magnet to turn 180 degrees, and drives the first U-shaped magnet to drive the metal disk to move towards a bottom of the vehicle until the metal disk and the first U-shaped magnet are received in the vehicle.

14. The vehicle according to claim 13, wherein the heat transferring device further comprises a second U-shaped magnet, the second U-shaped magnet is arranged above the first U-shaped magnet, two poles of the second U-shaped magnet are aligned in reverse to the poles of the first U-shaped magnet, facing poles of the first U-shaped magnet and the second U-shaped magnet have opposite polarity.

15. The vehicle according to claim 9, wherein the heat transferring device further comprises a plurality of heat pipes arranged on the shell of the vehicle, the plurality of heat pipes transfer the heat from the shell to the heat transferring device, and the heat transferring device transfers the heat to the ground.

16. The vehicle according to claim 15, wherein the heat pipe includes a fixing member and a moving member, the fixing members are arranged on fixed portions of the shell, and the moving members are arranged on movable portions of the shell.

* * * * *